J. M. YANIGLOS.
ANTISKID DEVICE.
APPLICATION FILED JUNE 22, 1920.
1,360,855.
Patented Nov. 30, 1920.
2 SHEETS—SHEET 1.
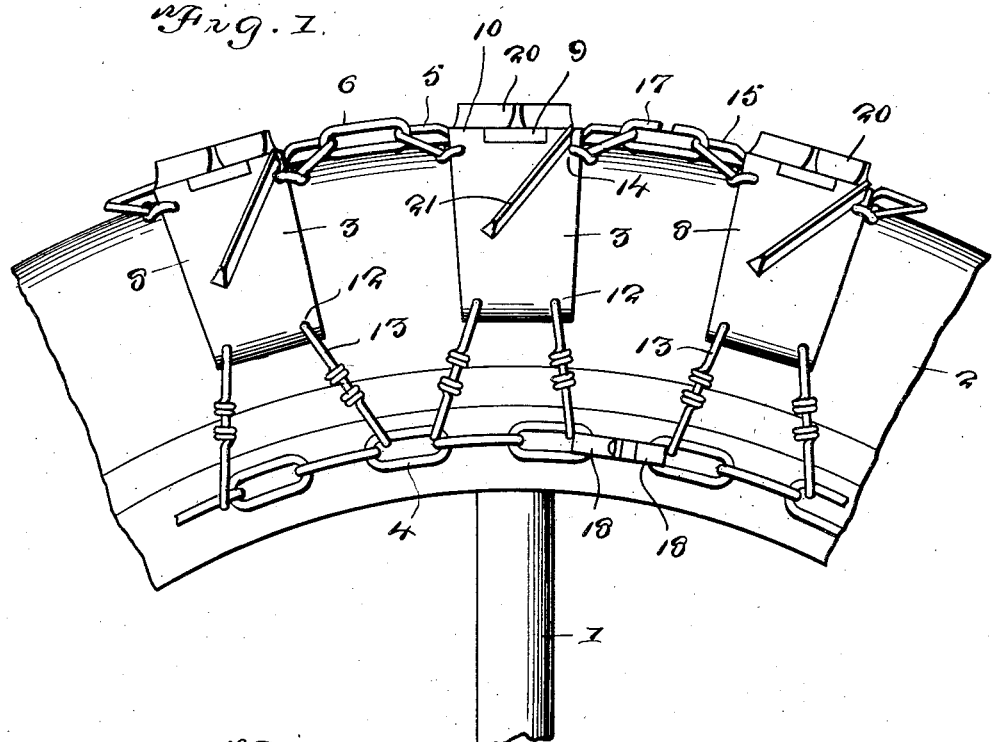
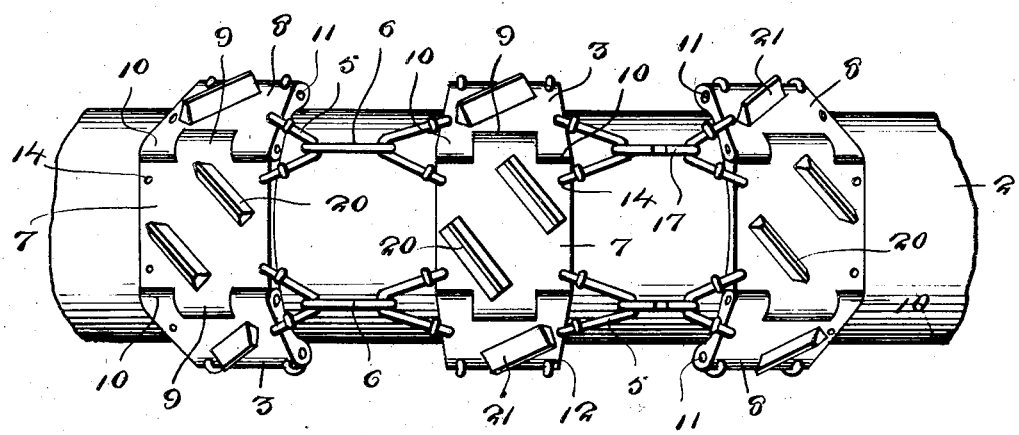

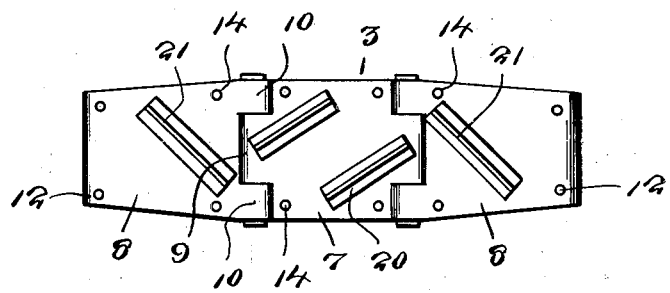
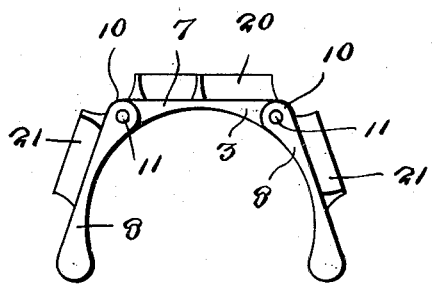
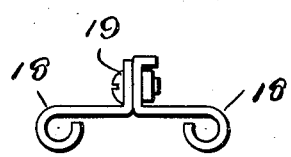
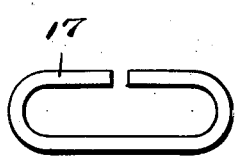

UNITED STATES PATENT OFFICE.

JOHN MARTIN YANIGLOS, OF NORTHAMPTON, PENNSYLVANIA.

ANTISKID DEVICE.

1,360,855. Specification of Letters Patent. Patented Nov. 30, 1920.

Application filed June 22, 1920. Serial No. 390,904.

*To all whom it may concern:*

Be it known that I, JOHN M. YANIGLOS, a citizen of Czechoslovakia, residing at Northampton, in the county of Northampton and State of Pennsylvania, have invented new and useful Improvements in Antiskid Devices, of which the following is a specification.

This invention relates to an anti skid device for automobiles, trucks and the like and the principal object of the invention is to provide a plurality of members, each consisting of a tread part and a pair of side parts, held in spaced relation on the tire by means of connecting chains or the like.

Another object of the invention is to provide means for hinging the side members to the tread members and to provide both the side members and the tread members with elongated fins or lugs which are inclinedly arranged on the members, the lugs and fins on the side members extending in a different direction from those on the tread members.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of a wheel supplied with my invention.

Fig. 2 is an edge view.

Fig. 3 is an enlarged face view of one of the anti skid members with its side members straightened out to show the position of the lugs or fins.

Fig. 4 is an edge view of one of the antiskid members.

Fig. 5 is an enlarged detail view of one of the devices for fastening the ends of the side chains together.

Fig. 6 is a detail view of one of the double hooks for connecting the U-shaped members of the two end members together.

In these views 1 indicates the wheel and 2 the tire thereof. The anti skid device is formed of a plurality of anti skid members 3 which are held on the tire by the side chains 4 and the flexible connections between the members which consists of the U-shaped links 5 connected with the sides of the members and the chain links 6 which connect the U-shaped links together. Each anti skid member comprises a tread plate 7 and a pair of side plates 8, the side plates being hinged to the tread plate. Each hinge is formed of a central part 9 on the tread plate and a pair of side parts 10 on the side plate which receive the part 9 between them so that the pin 11 will pass through all three parts. The side and tread plates are of bowed shape to conform to the shape of the tire and the outer edges of the side plates are thickened and these edges are perforated as at 12 to receive the links 13 which connect the plates with the side chains 4. As shown these links 13 diverge from the plate. Each of the side plates and tread plates are provided with holes 14 adjacent their hinge ends to receive the U-shaped links 15, each link having one of its ends engaging a hole in the side plate and its other end engaging a hole in the tread plate. The U-shaped links of adjacent plates are connected together by the chain links 6. The two end anti skid devices have their U-shaped links connected together by the double hooks 17, these hooks being so formed that they may be moved to disengage one of the U links when the device is to be removed from the wheel thus separating the ends of the device. The ends of the side chains are connected together by two pairs of hooked members 18, the members of each pair being connected together by the bolt and nut 19, one hook member being formed to receive the nut and hold it against turning while the other member is formed with a flat hook part to facilitate the screw bolt being engaged by a screw driver or the like.

Each of the tread plates is provided with a pair of lugs or fins 20 which are spaced apart and arranged at an inclination, as shown. Each side plate is also provided with an inclined lug or fin 21, this fin extending at substantially right angles to the fins on the tread plate, while the fin on one side plate extends in an opposite direction from that on the other side plate. The fins or lugs on the tread and side plates are so arranged as to prevent the wheel from spinning while being rotated in one direction or the other and also acting to provide side skidding of the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An anti skid device of the class described comprising a plurality of anti skid members spaced apart, rings connecting the members together, side chains, links connecting the ends of the members to said side chains, means for connecting the ends of the device together and each member comprising a tread plate, a pair of side plates hinged to the ends of the tread plate and lugs on said plates.

2. An anti skid device of the class described comprising a plurality of anti skid members, each comprising a tread plate and a pair of side plates hinged to the end of the tread plate, said plates being bowed to conform to the shape of the tire with the outer ends of the side plates thickened, lugs on the plates inclinedly arranged and extending in different directions, side chains, links connecting the side plates to said side chains and links connecting the side and tread plates of each member to the side and tread plates of the adjacent members.

3. An anti skid device of the class described comprising a plurality of anti skid members spaced apart, each member comprising a tread plate and a pair of side plates hinged to the ends of the tread plate, a U-shaped link having its ends connected to each end of each of the tread plates and to the adjacent end of each of the side plates, chain links connecting the U links together, a pair of side chains and links connecting the said side chains with the side plates.

In testimony whereof I affix my signature.

JOHN MARTIN YANIGLOS.